Nov. 25, 1941.　　　G. M. BUCHARD　　　2,264,066
TUBE TESTER
Filed Sept. 12, 1940
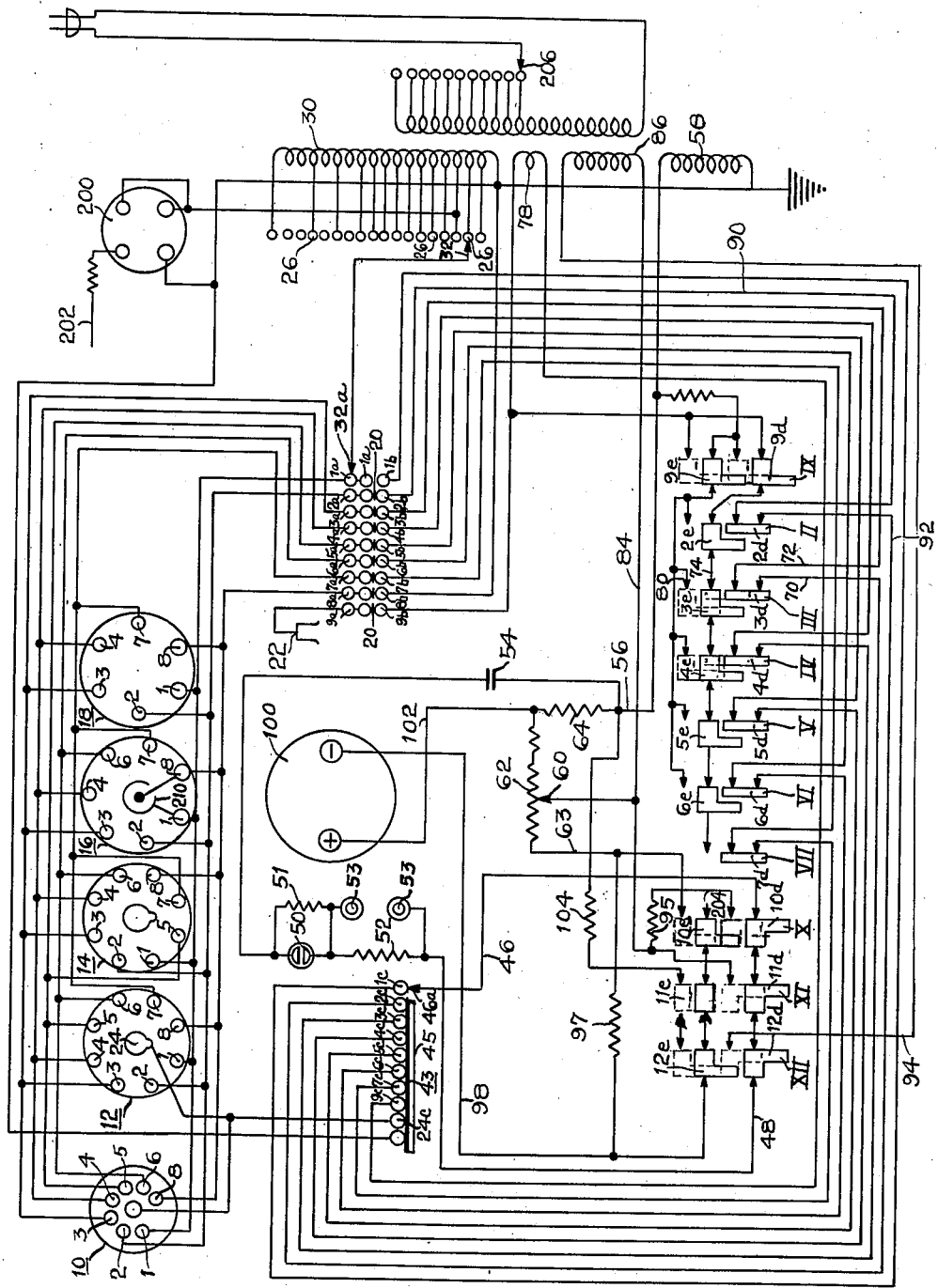
INVENTOR
George M. Buchard
BY
Henry G. Dybvig
ATTORNEY Patented Nov. 25, 1941

2,264,066

UNITED STATES PATENT OFFICE 2,264,066

TUBE TESTER

George M. Buchard, Dayton, Ohio

Application September 12, 1940, Serial No. 356,480

17 Claims. (Cl. 250—27)

This invention relates to tube testers and more particularly to a tube tester for testing the functioning of the several electrodes found in thermionic vacuum tubes and the like.

The device disclosed herein is a simplification and an improvement upon the tube tester disclosed in my Patent No. 2,198,242 patented April 23, 1940, for Tube tester. Reference is made to the above identified patent for a general discussion of the problems involved in the tube tester art. In addition to the tube tester shown herein being simplified from that disclosed in my patent, it has incorporated a device for reversing the current flowing through the indicating meter used in measuring certain types of tubes, such as tubes known in the trade as 70A7GT, having one anode connected to the heater filament. The switching mechanism incorporating the broad principles disclosed in my above identified patent has been changed, so as to use one bank of switches similar to those disclosed in my patent and a rotary switch having a plurality of contacts connected and grounded in seriatim. This type of switching mechanism has resulted in economy of manufacturing cost, without greatly reducing the sphere of adaptability.

An object of this invention is to provide a simplified tube tester for testing the functioning of a plurality of electrodes in any one thermionic vacuum tube selected from a great variety of types of thermionic vacuum tubes now appearing on the market by a tube tester that is dependable, efficient, economically produced and easily operated by an unskilled operator.

Another object of this invention is to provide a tube tester that, in response to manual manipulations, automatically tests the several electrodes in seriatim for short-circuit.

Another object of this invention is to provide a measuring device for indicating the condition of the electrodes, which measuring device may be utilized for measuring the flow of current in either direction.

Other objects and advantages reside in the construction of parts, the combination thereof and the mode of operation, as will become more apparent from the following description.

In the drawing, the single figure is a schematic wiring diagram simplified for the convenience of explanation, showing the circuit utilized in the tube tester shown and described herein.

The tube tester disclosed in the single figure is adapted to supply voltages and loads to the tube under test simulating actual operating conditions of the tube. This has been accomplished by supplying alternating voltages to the several electrodes of the tube in such a phase relation that the voltages build up to those corresponding to actual load voltages under normal operating conditions during a portion of a cycle of the alternating current. If, for example, a screen grid tube is to be tested, the normal operating conditions are approached when the positive half of the cycle reaches its maximum value. At this instance of time a positive voltage is supplied to the anode and screen grid.

In addition to testing the tube under normal operating conditions, it is also tested for short-circuits and leakage currents. This is accomplished by the use of a glow tube that is connected into the circuits of the several electrodes in seriatim. If the electrodes are separate and distinct from each other, the glow tube will not be illuminated, as the glow tube is connected with each electrode in seriatim, with some exceptions in connection with certain types of tubes. In some types of tubes one or more of the electrodes will be connected to the filament circuit in the tube, in which event, the glow tube will be illuminated when connected to these particular electrodes. This will appear more fully later.

In the drawing, the reference characters 10, 12, 14, 16 and 18 designate tube sockets. The number and type of tube sockets may be increased or decreased depending upon the use to which the tube tester is to be put. These tube sockets have been shown merely for the purpose of illustration, without limitation as to the number and type of sockets to be used. In the several tube sockets shown, the prong terminals connected into the same circuit have the same reference numerals. The peripherally disposed prong terminals have been designated by the reference numerals 1 to 8, the number of reference numerals depending upon the circuit arrangement. In tube 18, for example, there are only six prong terminals which happen to be connected into the circuits including the prong terminals 1, 2, 3, 4, 7 and 8. This particular tube socket has no prong terminals corresponding to the circuits including the prong terminals 5 and 6. Prong terminals 1 to 8 are connected through suitable leads to fixed contacts 1a to 8a respectively.

A cap 22 is adapted for connection to the control grid of some types of tubes. This cap 22 is connected to the fixed contact 9a. The fixed contacts 2a to 9a inclusive have been connected to the fixed contacts 2b to 9b by the use of movable connecting elements 20. These connecting elements are adjustable in unison. The prong terminals 1 and 8 have been connected into a suitable portion of the secondary winding 30 of the input transformer. As shown in the single figure, these connections may be adjusted to meet the requirements of the tube terminals under test. If, for example, one of the filament terminals of the tube is connected to the prong terminal 4 instead of the prong terminal 1, the contact 32a is adjusted from the contact 1a to 4a. The switch used is so designed that as the contact 32a is shifted from one contact to another, the connecting elements are adjusted accordingly, that is, when the contact 32a is shifted from 1a to 4a, the connecting element from 4a to 4b is removed and a like connecting element is inserted between 1a and 1b. When this takes place, 1a is then connected to 1c and 4a is disconnected from 4c. The switching arrangement including the movable contact 32a, connecting elements 20, the fixed contacts 1a to 9a and the fixed contacts 1b to 9b may be referred to as a special test switch, in that this switch performs the initial switching operation connecting one filament terminal to the secondary winding 30 and at the same time connecting the other prong terminals of the tube into their respective circuits, as will appear more fully later.

The winding 30 has a number of terminals or voltage taps 26, so as to supply the proper voltages to the filament. The movable contact 32, actuated by a suitable control knob not shown, is connected to the proper terminal 26. From this it may be readily seen that the prong terminals 1 and 8, as shown in the drawing, are supplied with the filament voltage as the filament of the tube under test is connected to these prongs. Of course, if the filament terminals of the tube under test are connected to other prong terminals, the filament voltage is then shifted to these other prong terminals. The fixed contacts 2b to 7b inclusive are connected to the movable contacts 2d to 7d in the gang of push button switches including the push buttons designated by the numerals II, III, IV, V, VI and VII. This type of push button gang switches has been fully shown and described in my Patent No. 2,198,242. That being the case, a detailed description of these push button switches will not now be made. The movable contacts 2d to 7d are connected through suitable leads when in the position shown in the full line position in the drawing to the fixed contacts 2c to 7c of a rotary switch. If the contact 1a is connected to the contact 2a by a movable connecting element 20, contact 1a is then connected in series with the contact 1c. The contact 9a is connected in series through a winding 78 with the contact 9c.

In tube sockets 10 and 12 the shell of the tube is connected to a center contact 24 that is connected to the contact 24c of the switch 43. Although the contacts 1c to 9c, 24c and ground have been arranged in a straight row, these are preferably arranged in a circular row and adapted to be engaged by a movable contact element 45, which, in actual practice, is a movable ring rotatably mounted. As this member 45, shown as a straight contact element in the single figure, is rotated, the contact 46a advances from one contact to the other. All of the other contacts are engaged by the ring 45, so as to ground all of the contacts excepting the one engaged by the movable contact 46a. If, for example, contact 46a were moved into engagement with 4c, all of the other contacts, that is, 1c, 2c, 3c, 5c, 6c, 7c, 9c, 24c and the ground terminal, would be connected into a common circuit by the ground ring 45. This type of a switch has been more fully shown and described in my Patent No. 2,172,953. The switch functions as an electrode selecting switch, both when making short-circuit tests and when conducting the normal operating tests, as will appear more fully later.

*Short-circuit test*

If any of the electrodes are short-circuited or have a leaking circuit with respect to any other electrode, the tube will not function satisfactorily. This test may be performed by the use of the switch 43. In conducting this test, the tube is first inserted into the proper socket after the movable contact 32 has been adjusted to the proper voltage tap 26 connected to the secondary winding 30. The movable connecting elements 20 are closed, as shown in the single figure, leaving the contact element 1a open. All of the push button switches II to XII inclusive are in the initial position, as shown in the full line position.

After the lapse of sufficient time to permit the heater element to heat the cathode to the temperature of normal operating conditions, the movable contact ring 45 is rotated, so as to cause contact 46a to engage each of the fixed contacts 1c, 2c, 3c, 4c, 5c, 6c, 7c, 9c and 24c one at a time in turn. It can readily be seen that when the movable connecting elements 20 are in the position shown in the drawing, the prong terminals 2, 3, 4, 5, 6, 7 and 24 are connected to the fixed contacts 2c, 3c, 4c, 5c, 6c, 7c and 24c respectively, that is, prior to the adjustment of the push button switches II to VII inclusive. By adjusting the switch contact 46a so as to cause this to contact each of the contacts 2c, 3c, 4c, 5c, 6c, 7c, 9c and 24c, the electrodes connected to the prong terminals 2, 3, 4, 5, 6, 7, grid cap 22 and shell contact 24 are each connected in turn into the short-circuit test circuit which will now be described.

This short-circuit test circuit includes the contact 46a, the lead 46, the full line position of the movable contact elements 10d, 11d and 12d, the lead 48, the resistance 52, the glow tube 50 connected in parallel with a resistance 51, the condenser 54, lead 56, the secondary winding 58 to ground. In the event the particular electrode connected to the contact 46a and the short-circuit test circuit is not short-circuited, the glow tube will not continue to glow. It may flash at the moment contact is made, due to switching into a circuit including a condenser which may be charged at the time contact is made. However, as soon as this has been charged, the glow tube will not continue to glow excepting in special cases when it is so indicated on the test chart. In the event the particular electrode connected into the test circuit is short-circuited to any other electrode or to the shell of the tube, the glow tube circuit will be closed through the ground ring, so as to cause the glow tube to be illuminated. The ground ring 45, as already explained, connects all of the other electrodes excepting the high voltage terminal of the filament to the ground terminal.

The glow tube 50 provides a visual indication of short-circuits. In addition thereto, a noise test may be made by connecting ear phones into the ear phone jack terminals 53 connected across the terminals of the resistance 52. This audio test has some advantages over the glow tube test, in that if an open-circuit is caused by jarring or vibrating the tube under test, this may be detected by the audio test, without the glow tube illuminating. Furthermore, an open circuited electrode may be detected by vibrating the tube under test. If the electrode is open circuited, the make and break circuit caused by poor weld, et cetera, would cause audible signals in the ear phones.

It is to be noted that contact 8a, connected into the filament circuit, is not connected to any of the contacts in the switch 43, excepting the ground terminal. Furthermore, the contact 1a has not been connected to the contact 1b for this test, as shown in the drawing.

The above test may be applied to most of the tubes without exceptions as to the outcome. There are some tubes on the market that do not give the same results. In the event one of the electrodes should be connected to the filament circuit, which, for example, happens to be the case in the 70A7GT tube, wherein the rectifying anode is connected to the filament, the glow tube would illuminate immediately upon the rectifying anode terminal being contacted through the circuit connecting this anode to one of the terminals in the switch 43. There are other tubes that will have certain electrodes that will illuminate the glow tube, even though there is no short-circuit. These exceptional tubes are so identified on a suitable chart furnished with the tube tester.

Before testing the normal operation of the tube, the line voltage supplied to the tube tester should be measured and tested. This has been accomplished by the use of the same milliammeter as used in testing the several electrodes of the tube. For the sake of economy, a direct current milliammeter 100 has been used, as the current flowing through the several electrodes of the tube always flows in one direction through the particular electrode. That being the case, it is necessary to rectify the input voltage before it is supplied to the milliammeter. This has been accomplished by the use of a rectifying tube 200 connected to a suitable portion of the secondary winding of the input transformer.

The anode rectifying tube 200 has been connected by a suitable lead 202 to the fixed contact 204 of the push button switch X. For the sake of clearness, this lead 202 has been omitted from the drawing, so as to avoid confusion as far as the wiring is concerned. The anode is connected through the lead 202 to the contact 204 through the movable elements 10e, 11e and 12e through the lead 98 to the milliammeter 100 having the other terminal connected to the lead 102. The circuit is completed through the resistance 64, the lead 56 and the winding 58. The milliammeter is now connected in parallel with resistances 62 and 97. If the voltage as measured by the current flowing through the milliammeter 100 is either too high or too low, the line voltage tap 206 may be adjusted to a proper terminal on the primary winding, so as to provide the proper step-up ratio or step-down ratio, as the case may be, in the several secondary windings.

*Milliammeter electrode testing circuit*

When the movable contact 60 of the potentiometer is energized, the current divides through the resistance 62. From the left terminal of the resistance 62 the current flows through a conductor 63, through a resistance 97, through the lead 98 to one terminal of the milliammeter 100. The other terminal of the milliammeter is connected by a lead 102 to the right terminal of the resistance 62, then through the resistance 64 connected by lead 56 to one terminal of the secondary winding 58, having its other terminal connected to ground. The circuit connected to the movable contact 60 will now be described more fully.

*Testing normal operation of tube*

With each tube tester a chart is furnished, indicating the various positions to which the contacts are to be adjusted in order to conduct the tests on the tubes. A few illustrations of the operation of the tube tester, so as to illustrate its function, will now be made. In this connection the circuits used in making the several tests will be traced. This chart furnished with the tube tester lists the proper settings for the filament, potentiometer and circuit controls. The proper filament voltage, as already explained, is obtained by adjusting the contact 32 to the proper terminal 26.

After the filament voltage value adjustment may follow the adjustment of the potentiometer including the resistance 62 and the adjustable contact 60, so as to calibrate the milliammeter. By adjusting the contact 60, the current flowing through the milliommeter 100 is adjusted, so that if the tube under test has a normal current flow through the electrode under test, the reading on the milliammeter will register with the normal zone of the milliammeter. The contact 60 is preferably controlled by a suitable knob (not shown) having an indicant registering with suitably identified indicia. These indicia may be graduated from 0 to 100. Then, if the test chart shows 20, it is merely necessary to adjust the knob to move the indicant into registry with the graduation marked 20.

The tube chart, in addition to furnishing the filament and milliammeter calibration adjustment, also has a circuit test column which designates the proper test buttons to be used and the proper adjustment of the switch 43. For example, if a 2A3 tube is to be tested, the test chart indicates that a 2½ volt filament voltage should be supplied to the filament, the indicant for the potentiometer adjusted to 20 and the circuit test includes the adjustment of electrode selecting contact element 46a to the fixed contact 2c, depressing the push button switches III and XII from the full line position to the dot-dash position. By depressing push button III, the fixed contact 3b is disconnected from 3c and instead, the contact 3b is connected by the movable contact 3d shifted from the full line position into the dotted position by the contact 74 connected through the movable contact 9d in the full line position to one terminal of the grid voltage secondary winding 78. Thus, the control grid of the tube under test is energized. The anode of the tube is connected to the prong terminal 2 of the particular socket used. The prong terminal 2 is connected to the contacts 2a and 2b, which contact 2b is connected through a suitable lead 90 to the contact 2d, then through a suitable lead 92 to the contact 2c.

The proper voltage and the proper load are supplied to the measured electrode of the tube under test by actuating the proper push button switch, which may be referred to as load switches X, XI and XII, either alone or in combination. For the 2A3 tube, the push button XII is depressed. The circuit is then completed from 2c engaged by the contact 46a, through the lead 46, the movable contact 10d in full line position, the movable contact 11d in full line position, the movable contact 12d in dotted position, the lead 94 connected to one terminal of the secondary winding 86, the lead 84 to the adjustable contact 60, where the circuit is completed through the milliammeter circuit that has already been described. As the milliammeter circuit, as has been described, includes the secondary winding 58, two voltages are supplied to the particular electrode under test. If, for example, the secondary winding 58 supplies 110 volts and the secondary winding 86 supplies 100 volts, the total voltage supplied to the circuit under this test is 210 volts. When the push button XII is held in the depressed position, if the milliammeter needle swings to the normal zone, the proper amount of current flows through the electrode of the tube under test. In the event the needle does not swing to the proper zone, the tube is defective for some reason or other.

In other types of tubes the prong terminals are not arranged in the same order. This may best be illustrated by tracing the circuit for testing a 6C6 tube. Referring to the chart that accompanies the tube tester, the filament voltage for this type tube is 6.3 volts. The contact 32 is adjusted to obtain this particular voltage. The potentiometer adjustment is 64. The knob controlling the movable contact 60 is thus adjusted. The circuit tests includes the adjustment of the switch 43 to the contact 2c and depressing the push button switches IX, III and XII. In this particular tube the prong terminal 3 is connected to the screen grid of the tube. That being the case, it is necessary to reverse the voltages supplied to the control grid and the screen grid. This has been accomplished by actuating the push button switch IX, actuating the two movable contact elements 9e and 9d from the full line position to the dot-dash position. By this arrangement, voltage from the winding 58 is supplied to the electrode of the prong terminal 3. Aside from that, the reading is the same as in the above illustration.

Some tubes have two functions. Such a tube may function as an amplifying tube and at the same time as a rectifier or an oscillator or a detector, or other functions depending upon the particular type of tube used and the circuit into which it is adapted. Such a tube requires two or more tests. For the purpose of illustration, the tube tester will be adjusted for testing a 70A7GT type tube.

In this particular type of tube one portion of the tube functions as a rectifier, having the plate circuit connected into the filament. The plate circuit is, so to speak, tapped into the filament, so as to provide proper plate voltage. The tap is connected to the filament so as to leave sufficient voltage across the remainder of the filament for use as a pilot light voltage. Referring to the chart accompanying the tube tester, it is found that this particular type of tube requires 70 volts across the filament. This is obtained by adjusting the movable contact 32 to the proper terminal 26. Referring to the potentiometer adjustment column, two values have been given, one the graduation 35 and the second the graduation 33. The control knob controlling the adjustable contact 60 is first adjusted to the graduation 35. When this is adjusted to the graduation 35, the contact element 46a is adjusted to the contact 2c. The push buttons IX, III, IV and XI are each depressed. Push buttons III, IV and IX are held in "down" position automatically, as described in the above referred to Patent No. 2,198,242.

By depressing push button III, the secondary winding 78 supplies a grid voltage to the prong terminal 3. At the same time the terminal 3b is disconnected from 3c. The movable contact 3e connects the terminal 80, so as to energize the movable contacts 4e, 5e and 6e. By depressing the push button IV, the movable contact 4d disconnects the terminal 4b from the terminal 4c and in turn connects the terminal 4a to the contact 80 through 3e in dotted position. By this arrangement, the electrode connected with the prong terminal 4 is energized from the secondary winding 58. By depressing the push button load switch XI, contact 46a through lead 46 is connected through the contact 10d, adjusted into dot-dash position, connected by suitable lead through the resistance 95, connected in series with the movable contact 60, connecting the electrode in the milliammeter circuit, as described above.

After this test has been completed, the second test may be conducted. The adjustable contact 60 is adjusted to the graduation 33. The adjustable contact of the switch 43 is adjusted to the contact 7c. The two push buttons XI and XII are depressed simultaneously. By depressing XI and XII simultaneously, the current supplied to the milliammeter is reversed. This has been accomplished by completing a Wheatstone bridge circuit between the terminal of lead 56 and the movable contact 60. The resistances 64 and 104 are arranged in parallel with the resistances 62 and 97. The resistances 62 and 97 are also arranged in parallel with the milliammeter 100. When the push buttons XI and XII are closed simultaneously, this completes the Wheatstone bridge circuit, which causes the flow of current through the milliammeter 100 to reverse. If the current flowing through the milliammeter for each of the sections of the tube under test is the required current, the tube is functioning properly.

In tube socket 16, a light socket 210 has been connected to the prong terminals 1 and 8, so as to provide a test for the dial lights and the like.

Although the preferred modification of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A circuit network for use in a tube tester adapted to test the functioning of the electrodes of a tube for short-circuits and for load currents, said circuit network including means for interconnecting the electrodes of the tube under test into the circuit network, two series of switching means the first series of switching means connecting the filament terminals of the tube under test into a suitable source of filament current and connecting at least some of the remaining electrodes into the second series of switching means, and a Wheatstone bridge circuit, said second switching means connecting predetermined electrodes to suitable load currents and a selected electrode into the Wheatstone bridge circuit, said Wheatstone bridge circuit having one arm normally open, an ammeter bridging said bridge circuit, and a switch for closing the circuit through said open arm, the closing of said open arm causing the current through the ammeter to be reversed.

2. A circuit network for use in a tube tester adapted to test the functioning of the electrodes of a tube for short-circuits and for load currents, said circuit network including means for interconnecting the electrodes of the tube under test into the circuit network, a plurality of parallel circuits at least one for each of the electrodes of the tube under test, at least two series of switching means in said circuit network, the first series of switching means connecting the filament terminals of the tube under test into a suitable source of filament current and connecting at least some of the remaining electrodes into the second series of switching means, and a Wheatstone bridge circuit, said second switching means connecting predetermined electrodes to suitable load currents and a selected electrode into the Wheatstone bridge circuit, said Wheatstone bridge circuit having one arm normally open, an ammeter bridging said bridge circuit for measuring the current flowing through the selected electrode, and a switch for closing the circuit through said open arm, the closing of said open arm causing the current through the ammeter to be reversed.

3. A circuit network for use in a tube tester adapted to test the functioning of the electrodes of a tube for short-circuits and for load currents, said circuit network including means for interconnecting the electrodes of the tube under test into the circuit network having suitable sources of voltages for energizing the electrodes of the tube under test, a plurality of parallel circuits at least one for each of the electrodes of the tube under test, switching means in said parallel circuits for selecting the circuit combination for testing the tube, means for indicating the current flowing from one electrode to another, and means for reversing the current through said indicating means.

4. A circuit network for use in a tube tester adapted to test the functioning of the electrodes of a tube for short-circuits and for load currents, said circuit network including means for interconnecting the electrodes of the tube under test into the circuit network, two series of switching means connected in series with the electrodes when in initial position, one series of switching means including a plurality of push button switches one for each of the electrodes of the tube under test, the second series of switching means including a plurality of circularly disposed fixed contacts, and a rotary ground ring for interconnecting the fixed contacts in seriatim, short-circuit testing means interconnected to said ground ring for testing the electrodes in seriatim for short-circuit, manipulation of predetermined push button switches interconnecting the electrodes of the tube under test into test circuits, voltage selecting means for interconnecting the circuit network in series with the tube under test, and means for supplying pre-determined voltages to the tube under test, said means supplying loads and voltages simulating normal operating conditions of the tube under test.

5. A circuit network for use in a tube tester adapted to test the electrodes of a tube, said circuit network including means for interconnecting the electrodes of the tube under test into the circuit network, a plurality of voltage sources, special test switching means for interconnecting the filament of the tube under test to one of said voltage sources so as to energize the filament of the tube under test, said special test switching means interconnecting the other electrodes of the tube into a plurality of parallel test circuits, a plurality of switching means for interconnecting the electrodes into the voltage sources, a current indicating device, and an electrode selecting switching means for connecting the selected electrode to said current indicating device for measuring the functioning of the selected electrode.

6. A circuit network for use in a tube tester adapted to test the electrodes of a tube, said circuit network including means for interconnecting the electrodes of the tube under test into the circuit network, a plurality of voltage sources, switching means for interconnecting the filament terminals of the tube under test to one of said voltage sources so as to energize the tube under test, said switching means interconnecting the other electrodes of the tube into a plurality of parallel test circuits, there being one circuit for each electrode, switching means including a switch for each of some of the electrodes of the tube under test, for interconnecting the electrodes of the tube to the voltage sources in a predetermined order, so that the first switch supplies a predetermined voltage to its electrodes, and the succeeding switches supply another voltage to the suceeding electrodes, a current indicating device, and switching means for connecting the current indicating device to a selected electrode for measuring the current flowing through the selected electrode.

7. A circuit network for use in a tube tester adapted to test the electrodes of a tube, said circuit network including means for interconnecting the electrodes of the tube under test into the circuit network, a plurality of voltage sources, switching means for interconnecting the filament terminals of the tube under test to one of said voltage sources so as to energize the tube under test, said switching means interconnecting the other electrodes of the tube into a plurality of parallel test circuits, there being one circuit for each electrode, switching means including one switch for each of some of the electrodes of the tube under test for interconnecting the electrodes of the tube into the voltage sources in a predetermined order, so that the first switching means connects its circuit to a predetermined voltage, and the succeeding switching means supply another voltage to their circuits, a reversing switch for reversing the order of the voltages supplied to the electrodes, a current indicating device, and switching means for connecting the current indicating device to a selected electrode for measuring the current flowing through the selected electrode.

8. A circuit network for use in a tube tester adapted to test the electrodes of a tube, said circuit network including means for interconnecting the electrodes of the tube under test into the circuit network, a plurality of voltage sources, switching means for interconnecting the filament terminals of the tube under test to one of said voltage sources so as to energize the tube under test, said switching means interconnecting the other electrodes of the tube into a plurality of parallel test circuits, there being one circuit for each electrode, switching means including one switch for each of some of the electrodes of the tube under test for interconnecting the electrodes of the tube into the voltage sources in a predetermined order, so that the first switching means connects its circuit to a predetermined voltage, and the succeeding switching means supply another voltage to their circuits, a reversing switch for reversing the order of the voltages supplied to the electrodes, a current indicating device, a reversing bridge for reversing the current through the indicating device, and switching means for connecting the current indicating device to a selected electrode for measuring the current flowing through the selected electrode.

9. A circuit network for use in a tube tester adapted to test the electrodes of a tube, said circuit network including means for interconnecting the electrodes of the tube under test into the circuit network, a plurality of voltage sources, switching means for interconnecting the filament terminals of the tube under test to one of said voltage sources so as to energize the tube under test, said switching means interconnecting the other electrodes of the tube to a plurality of parallel test circuits, there being one circuit for each electrode, and switching means including a switch for each of some of the electrodes of the tube under test for interconnecting the electrodes of the tube to the voltage sources in a predetermined order, so that the first switch supplies a predetermined voltage to its electrode, and the succeeding switches supply another voltage to the succeeding electrodes.

10. A circuit network for use in a tube tester adapted to test the electrodes of a tube, said circuit network including means for interconnecting the electrodes of the tube under test into the circuit network, a plurality of voltage sources, switching means for interconnecting the filament terminals of the tube under test to one of said voltage sources so as to energize the tube under test, said switching means interconnecting the other electrodes of the tube into a plurality of parallel test circuits, there being one circuit for each electrode, switching means including one switch for each of some of the electrodes of the tube under test for interconnecting the electrodes of the tube to the voltage sources in a predetermined order, so that the first switching means connects its circuit to a predetermined voltage, and the succeeding switching means supply another voltage to their circuits, and a reversing switch for reversing the order of the voltages supplied to the electrodes.

11. A circuit network for use in a tube tester adapted to test the electrodes of a tube, said circui network including means for interconnecting the electrodes of the tube under test into the circuit network, a plurality of voltage sources, means for interconnecting the filament of the tube under test to one of said voltage sources, so as to energize the filament of the tube under test, a plurality of parallel test circuits, a plurality of switching means for interconnecting the electrodes to the voltage sources through said parallel circuits, a current indicating device, electrode selecting switching means for connecting the selected electrode to said current indicating device, and switching means for supplying a load to the selected electrode so as to measure the functioning of the electrode with a load supplied thereto.

12. A circuit network for use in a tube tester adapted to test the electrodes of a tube, said circuit network including means for interconnecting the electrodes of the tube under test into the circuit network, a plurality of voltage sources, means for interconnecting the filament of the tube under test to one of said voltage sources, so as to energize the filament of the tube under test, switching means for interconnecting the electrodes of the tube into a plurality of parallel test circuits, a plurality of push button switches in some of said parallel circuits for interconnecting at least some of the electrodes into the voltage sources, a current indicating device, and electrode selecting rotary switching means for connecting a selected electrode to said current indicating device for measuring the functioning of the selected electrode.

13. A circuit network for use in a tube tester adapted to test the electrodes of a tube, said circuit network including means for interconnecting the electrodes of the tube under test into the circuit network, a plurality of voltage sources, means for interconnecting the filament of the tube under test to one of said voltage sources, so as to energize the filament of the tube under test, switching means for interconnecting the electrodes of the tube into a plurality of parallel test circuits, a plurality of push button switches in some of said parallel circuits for interconnecting at least some of the electrodes into the voltage sources, a current indicating device, an electrode selecting switch for connecting a selected electrode through said current indicating device to a suitable source of voltage simulating the normal load voltage for the tube under test, and a plurality of push button load switches for supplying a load to the selected electrode.

14. A circuit network for use in a tube tester adapted to test the electrodes of a tube, said circuit network including means for interconnecting the electrodes of the tube under test into the circuit network, a plurality of voltage sources, means for interconnecting the filament of the tube under test to one of said voltage sources, so as to energize the filament of the tube under test, switching means for interconnecting the electrodes of the tube to a plurality of parallel test circuits, a plurality of push button switches in some of said parallel circuits for interconnecting at least some of the electrodes into the voltage sources, a current indicating device, electrode selecting switching means for connecting a selected electrode to said current indicating device and for interconnecting the remaining electrodes of the tube under test, and a plurality of push button load switches for supplying a load to the selected electrode.

15. A circuit network for use in a tube tester adapted to test the electrodes of a tube, said circuit network including means for interconnecting the electrodes of the tube under test into the circuit network, a plurality of voltage sources, means for interconnecting the filament of the tube under test to one of said voltage sources, so as to energize the filament of the tube under test, a plurality of push button switching means for interconnecting at least some of the electrodes to the voltage sources, a current indicating device, electrode selecting switching means for connecting the selected electrode to said current indicating device, and a plurality of push button load switches for supplying a selected load to the selected electrode.

16. A circuit network for use in a tube tester adapted to test the electrodes of a tube, said circuit network including means for interconnecting the electrodes of the tube under test into the circuit network, a plurality of voltage sources, means for interconnecting the filament of the tube under test to one of said voltage sources, so as to energize the filament of the tube under test, a plurality of push button switching means for interconnecting the electrodes of the tube to the voltage sources in a predetermined order, so that the first switching means supplies a predetermined voltage to its electrode and a succeeding switching means supplies another voltage to a succeeding electrode, a current indicating device, electrode selecting switching means for connecting a selected electrode to said current indicating device, and a plurality of load switches for supplying a selected load to the selected electrode.

17. A circuit network for use in a tube tester adapted to test the electrodes of a tube, said circuit network including means for interconnecting the electrodes of the tube under test into the circuit network, a plurality of voltage sources, means for interconnecting the filament of the tube under test to one of said voltage sources, so as to energize the filament of the tube under test, a plurality of push button switching means for interconnecting the electrodes of the tube to the voltage sources in a predetermined order, so that the first switching means supplies a predetermined voltage to its electrode and a succeeding switching means supplies another voltage to a succeeding electrode, means for reversing the order of said voltages, a current indicating device, electrode selecting switching means for connecting a selected electrode to said current indicating device, and a plurality of load switches for supplying a selected load to the selected electrode.

GEORGE M. BUCHARD.